US008694497B2

(12) United States Patent
Bacher et al.

(10) Patent No.: US 8,694,497 B2
(45) Date of Patent: Apr. 8, 2014

(54) METHOD, SYSTEM, AND COMPUTER PROGRAM PRODUCT FOR ENABLING FILE SYSTEM TAGGING BY APPLICATIONS

(75) Inventors: Utz Bacher, Weil im Schoenbuch (DE); Einar Lueck, Stuttgart (DE); Thomas Spatzier, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 12/258,493

(22) Filed: Oct. 27, 2008

(65) Prior Publication Data

US 2010/0114977 A1    May 6, 2010

(51) Int. Cl.
*G06F 7/00* (2006.01)

(52) U.S. Cl.
USPC .......................................................... 707/736

(58) Field of Classification Search
USPC ........... 707/999.104, 784, 637, 736, 999.101, 707/999.102
See application file for complete search history.

(56) References Cited

U.S. PATENT DOCUMENTS

| | | | |
|---|---|---|---|
| 7,003,522 B1* | 2/2006 | Reynar et al. ................. | 707/736 |
| 8,005,812 B1* | 8/2011 | Mosterman et al. .......... | 707/708 |
| 2004/0049503 A1* | 3/2004 | Modha et al. ................. | 707/3 |
| 2005/0210008 A1* | 9/2005 | Tran et al. .................... | 707/3 |
| 2007/0027887 A1* | 2/2007 | Baldwin ....................... | 707/100 |
| 2007/0124208 A1 | 5/2007 | Schachter et al. | |
| 2007/0130197 A1* | 6/2007 | Richardson et al. ......... | 707/103 R |
| 2008/0010262 A1* | 1/2008 | Frank ............................. | 707/3 |
| 2008/0010273 A1* | 1/2008 | Frank ............................. | 707/5 |
| 2008/0021924 A1* | 1/2008 | Hall et al. ..................... | 707/103 X |
| 2008/0117225 A1* | 5/2008 | Wegenkittl et al. ........... | 345/581 |
| 2008/0275851 A1* | 11/2008 | Taylor et al. .................. | 707/3 |
| 2009/0077108 A1* | 3/2009 | Burnett ......................... | 707/101 |

* cited by examiner

*Primary Examiner* — Hosain Alam
*Assistant Examiner* — Eliyah S Harper
(74) *Attorney, Agent, or Firm* — Cantor Colburn LLP; Steven Bennett

(57) ABSTRACT

A method for enabling file system tagging by an application includes creating tag associations for the file system by associating a tag with a file object. The association includes allocating a file association structure (FAS) in the storage device, which FAS has attributes including a pointer to a file handle of the file object and a list of names of tags associated with the file object. Associating the tag with a file object also includes allocating a tag structure for each tag in the file system. The tag structure includes a tag name and file associations for the tag. In response to a request for a read directory operation, the method includes retrieving the tag associations to identify the file object, dynamically assembling a directory entry structure that includes a hierarchical view of tags identified from the tag associations and corresponding file object, and returning the directory entry structure to the application.

20 Claims, 5 Drawing Sheets

US 8,694,497 B2

METHOD, SYSTEM, AND COMPUTER PROGRAM PRODUCT FOR ENABLING FILE SYSTEM TAGGING BY APPLICATIONS

BACKGROUND

The present invention relates to file systems, and more specifically, to a method, system, and computer program product for enabling file system tagging of files by applications.

In computer-implemented file systems and operating systems, files are typically stored in directory tree structures. Users of the structures traverse their way through the tree to find files that are stored in subdirectories of the tree. This process can be time consuming as more directories, subdirectories, and files are added to the tree.

One way to provide faster access to data is to associate tags with the data. U.S. Patent Publication 20070124208A1, entitled "Method and Apparatus for Tagging Data," filed on Oct. 25, 2006, describes how tagging operations are performed. A tag may be described as a keyword associated to data objects. These objects can be given multiple tags. A search for data objects can then be performed by looking for all objects that are tagged accordingly.

Operating system extensions have been developed to add tags to files as well (e.g., Microsoft® Vista™ and Apple's® Mac OS X). These tags are put into special nodes (i.e., data fields within a file) into files. Search applications (e.g., Spotlight™) match search criteria with databases built from these file nodes.

One drawback with these extensions is that the tagging operations work only if the file format is capable of (or extended to) carry such tag node structures. In addition, only applications that consider these tag node structures in files are capable of working with tags. Existing applications are not equipped to handle these tag node structures.

What is needed, therefore, is a way to provide file system tagging operations for applications.

SUMMARY

According to one embodiment of the present invention, a method for enabling file system tagging by an application includes creating tag associations for the file system by associating a tag with a file object. The association includes allocating a file association structure (FAS) in the storage device, which FAS has attributes including a pointer to a file handle of the file object and a list of names of tags associated with the file object. Associating the tag with a file object also includes allocating a tag structure for each tag in the file system. The tag structure includes a tag name and file associations for the tag. In response to a request for a read directory operation, the method includes retrieving the tag associations to identify the file object, dynamically assembling a directory entry structure that includes a hierarchical view of tags identified from the tag associations and corresponding file object, and returning the directory entry structure to the application.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

File system tagging operations for applications are provided in an exemplary embodiment of the invention. The file system tagging operations use file paths to associate tags with files. The tags are represented as directories. As several tags can be associated with a file, all permutations of none, one, some, or all tags (i.e., directory names) are paths to the same file. All subdirectories from a given root point (e.g., mount point or defined top level directory) in the path to the file are considered as tags. In other words, all components of the file names are the tags to which all the files in the directory are associated.

Figure 1:
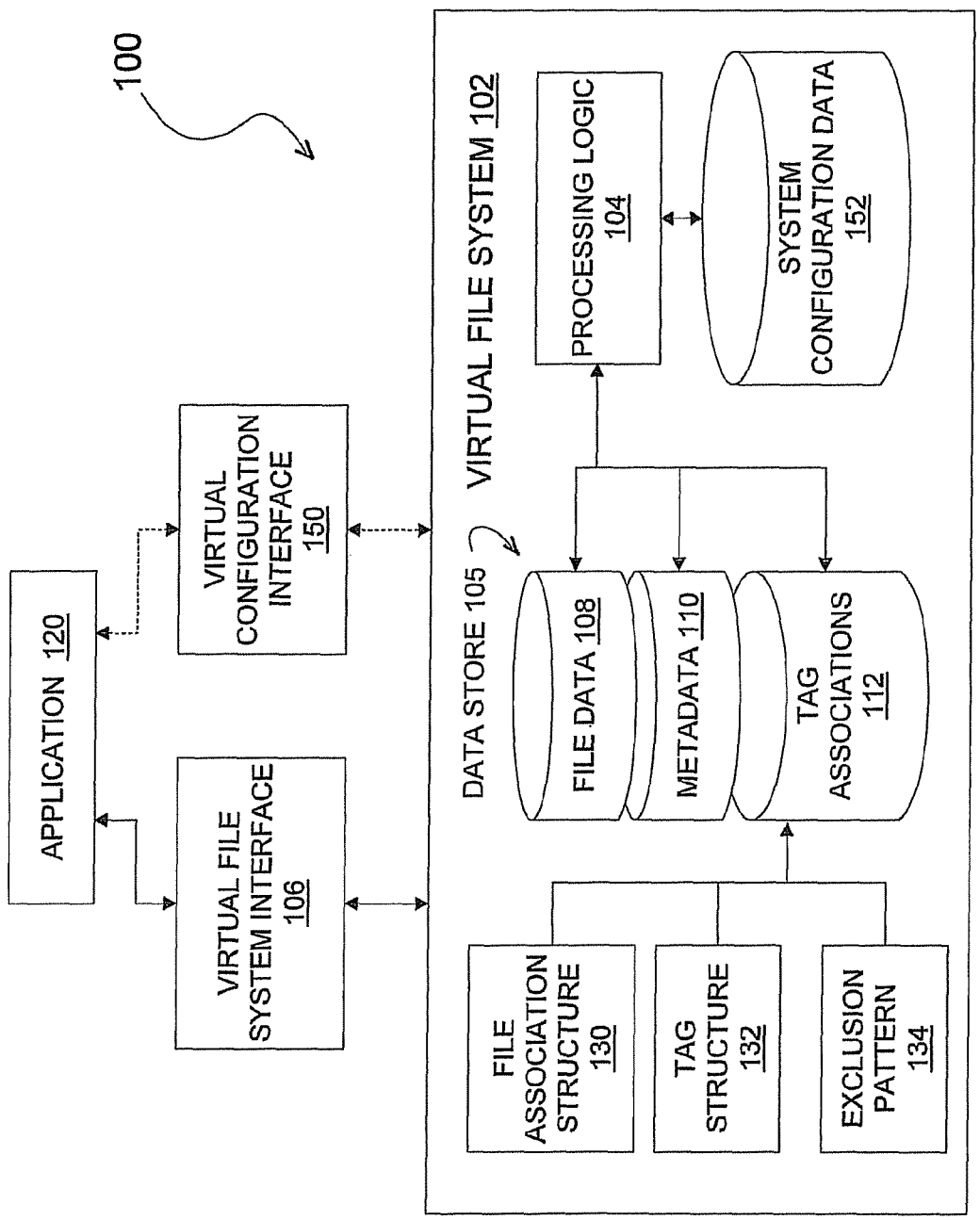
FIG. 1 is a block diagram illustrating a system upon which file system tagging processes may be implemented in an exemplary embodiment.

Turning now to FIG. 1, an exemplary system for enabling file system tagging operations by an application will now be described. The system 100 of FIG. 1 includes an application 120 in communication with a virtual file system 102 via a virtual file system interface (VFSI) 106. The application 120 may be a legacy application. For example, the application 120 may be an application that does not use specific (new) interfaces for tag handling, but only uses the classical filesystem interface. In order words, the application 120 does not have to have any extensions for using tags with files. Tags are transparent to the application 120 and defined semantically through the use of directory structures.

Each of the elements in the system 100 of FIG. 1, with the exception of application 120, is a component of an operating system associated with a computer processing device (not shown). The operating system may be any widely used system, e.g., Linux®. The computer device may be a general-purpose computer (e.g., desktop, laptop, etc.) or may be a high-powered computer processing device (e.g., enterprise server or mainframe computer). The application 120 may be any commercially available or proprietary software application. The application 120 may be executing on the computer processing device implementing the operating system of FIG. 1 or may reside on a remote computer processing device and in communication with the system 100 of FIG. 1 via, e.g., a network.

In an exemplary embodiment, the virtual file system 102 includes processing logic 104 and a data store 105. The processing logic 104 implements various functions to perform the file system tagging processes described herein. The data store 105 may be implemented as a storage unit or device that is addressable by the processing logic 104. In an alternative embodiment, the data store 105 may be implemented on top of an external file system component. The data store 105 stores file data 108, metadata 110, and tag associations 112. As shown in FIG. 1, these items 108, 110, and 112 may be stored in separate locations in the data store 105. File data 108 represents files (also referred to as file objects), which may include any type of data representation, such as text documents, image files, digital audio, and multi-media. The metadata 110 is used to manage objects within the file data 108 and may also include operations that may be performed on the objects. Metadata 110 may include file access dates, permissions, etc.

In an exemplary embodiment, the tag associations 112 are implemented as data structures used by the processing logic 104 in performing the file system tagging operations. The data structures include a file association structure (FAS) 130 and a tag structure 132. An FAS 130 is allocated in the data store 105 for each file (file object) (e.g., files in file data storage 108). The FAS 130 includes two attributes: a pointer to the file handle (e.g., O/S identifier, or virtual file system 102 inode object for the file and a list of names of all tags associated with the file. A list of FASs 130 and sample data are shown and described in FIG. 4. An inode is a term used to identify a specific file on a storage disk. In an operating system, a file is specified by the inode to the file. A file handle is a term that describes the handle an application has on a file after it has opened the file.

A tag structure 132 is allocated for each tag that exists in the file system. The tag structure 132 has several attributes. One attribute is a name of the tag. A second attribute is a list of file associations for the tag (i.e., a linked list of file association objects). A third attribute includes an indication (e.g., Boolean) of whether the tag represents a tag sphere. A fourth attribute includes a list of contained tags if the tag itself represents a tag sphere. A list of tag structures and sample data are shown and described in FIG. 4.

Also stored in the tag associations 112 portion of the data store 105 includes an exclusion pattern file 134. The exclusion pattern file 134 is used in conjunction with an optional virtual configuration interface (VCI) 150 to configure tags in a way that specified files or file name patterns are excluded from tagging. Patterns of files to be excluded from tagging are stored in an exclusion pattern list in the pattern file 134. An entry in this list may be a file name or any path expression (containing wildcards, etc.). Each file having a name or path that match one of the entries in this list will be excluded from tagging.

The VCI 150 provides a communication interface between the application 120 and the virtual file system 102. The VCI 150 may configure the operating system by interfacing with special virtual files that represent operating system configuration settings. These virtual files may be dynamically generated and exposed to a user via the VCI 150. Operating system configuration data 152, as shown in FIG. 1, represents these settings. The configuration data 152 is accessed by the processing logic 104 and provides file information to a user, e.g., a user of application 120 or a system administrator accessing the computer processing device. Reading from the virtual files present settings that are present in the operating system. Writing to a virtual file allows for changing configuration parameters.

The file system tagging operations leverage the VCI 150 and system configuration data 152 for declaring tag spheres and for declaring exclusion patterns for files that should not be tagged. For example, in order to declare a tag as a tag sphere, the name of the tag is written to a special file (e.g., /.tagspheres). Reading from that file presents a list of all declared tag spheres. A tag sphere can be removed by writing a special command followed by the tag name to the file (e.g., writing '--<tag name>' to the file). Likewise, declaring a pattern exclusion may be implemented in a similar fashion, e.g., writing an exclusion pattern to a designated file (e.g., '/.tagexclusions').

Tags belong to tag spheres as a means for controlling the behavior of tags and the visibility of files underneath different tags. This allows for separating files that share a common tag and would thus occur in all possible tag path permutations into different spheres (i.e., path trees). By way of example, consider a file F1 tagged with 'foto' and 'private' and a file F2 tagged with 'foto' and 'business.' Normally, both files would occur in a directory '/foto' since both share the tag 'foto.' The complete permutation would be:

/business: F2
/business/foto: F2
/foto: F1, F2
/foto/business: F2
/foto/private: F1
/private: F1
/private/foto: F1

In order to separate the private and business related files, two tag spheres 'private' and 'business' can be declared with the result that files associated with a sphere will only be visible inside the respective directory tree in the file system. The resulting path combinations would then be:

/business: F2
/business/foto: F2
/private: F1
/private/foto: F1

Tags that do not explicitly belong to a user-defined tag sphere implicitly belong to the root tag sphere (as a default). The root tag sphere is a list of all tag structures representing tags that do not belong to a special sphere. Tags that represent a sphere have the respective indication set in their associated tag structure (see, e.g., TSI indicator in FIG. 4) and also store a list of all tag structures representing tags that belong to the tag sphere.

Figure 2:
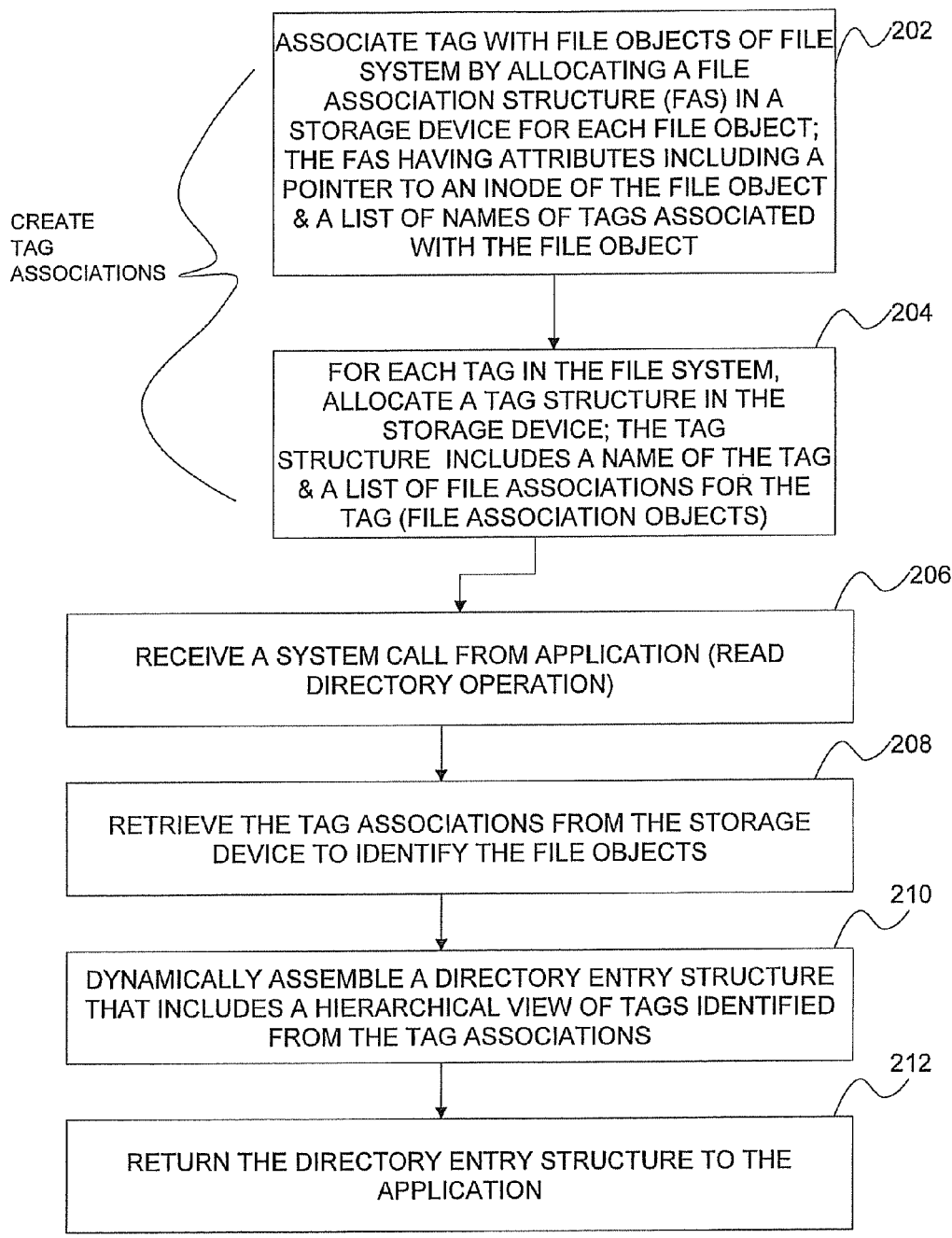
FIG. 2 is a flow diagram describing a process for implementing file system tagging operations and directory assembly in an exemplary embodiment.
Figure 4:
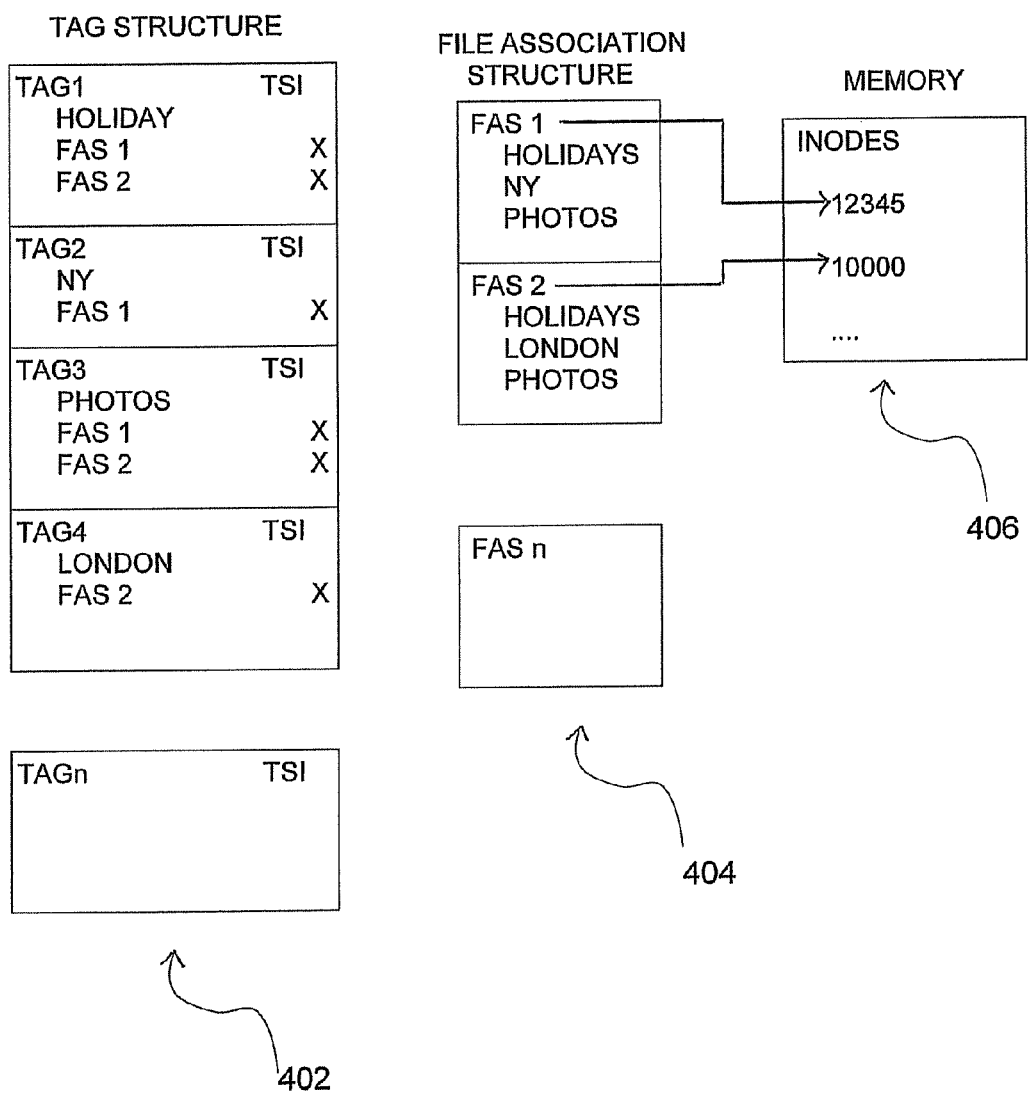
FIG. 4 illustrates data structures used in implementing the file system tagging operations in an exemplary embodiment.

Turning now to FIG. 2, a flow diagram describing a process for implementing file system tagging operations will now be described in an exemplary embodiment. Tag associations are created for all of the files (file objects) in the file data portion 108 of the data store 105 (as will be described in steps 202 and 204). At step 202, one or more tags are associated with a file object by allocating a FAS 130 in a storage device (e.g., the data store 105). For each tag in the file system, a tag structure 132 is allocated in the storage device at step 204. A listing 404 of FASs 130 and a listing 402 of tag structures 132 are shown in FIG. 4. As illustrated in FIG. 4, the tag structure listing 402 includes four tags: holiday, NY, photos, and London. In each tag structure 132 of the listing 402, file object identifiers are listed along with a tag sphere indicator (TSI). As indicated above, the file object identifiers may be assigned by the operating system when accessing a file. The FAS listing 404 includes two file objects. Each of the file objects has three tags. Also included in FIG. 4 is a record 406 of inodes. The record may be stored in the data store 105 or other system memory. Each of the FASs 130 in the listing 404 represent a file object and include a pointer to an entry in the record 406 which corresponds to the inodes of the file object.

With the file data 108, metadata 110 and tag associations 112 in place, the processing logic 104 is ready to perform one or more operations in response to requests from the application 120 via the VFSI 106. The virtual file system 102 does not store a directory structure as is typical in ordinary file systems. All file and directory information is returned to the application 120 dynamically.

Figure 3:
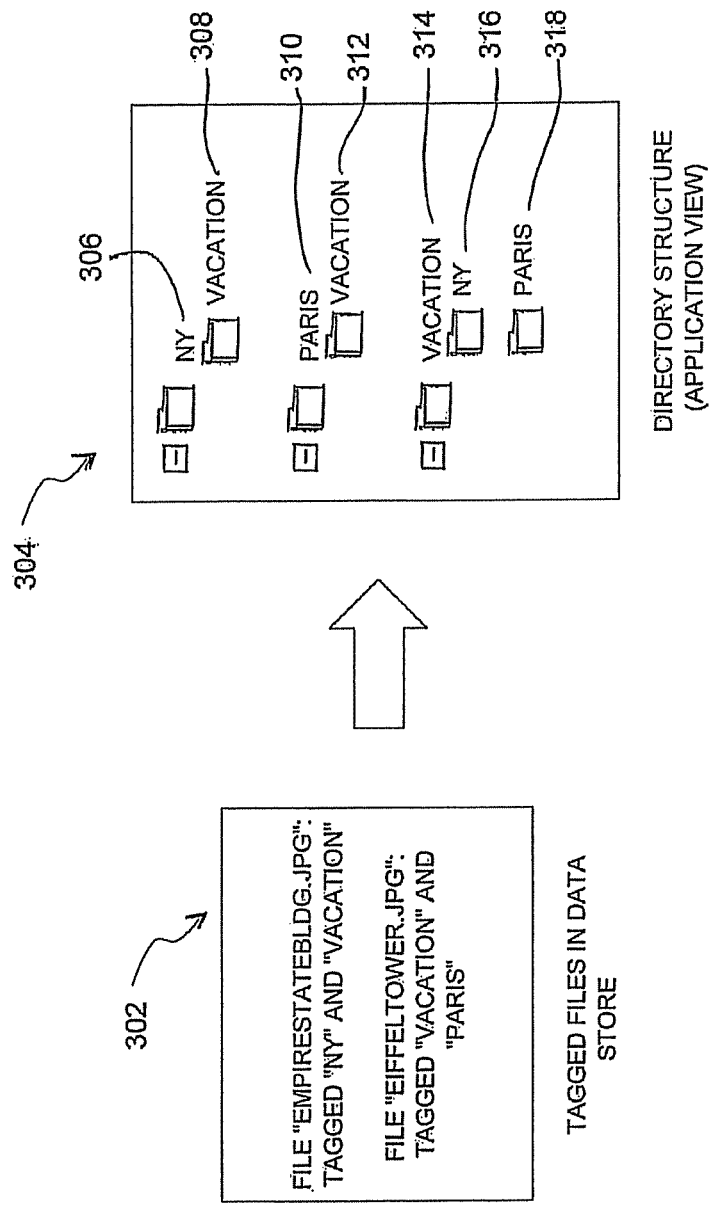
FIG. 3 is a diagram depicting a record of tagged files and corresponding directory structure resulting from the application of the system tagging operations on the record of tagged files in an exemplary embodiment.

Returning to FIG. 2, a read directory operation (system call) is received by the virtual file system 102 at step 206. The tag associations associated with the directory are retrieved at step 208. For example, the processing logic 104 splits the directory to be returned into its corresponding tags. The logic 104 then searches the file data 108 for all files associated with all of the tags. A function 'get_filenames_for_tag_set' may be used to perform this step. A sample list 302 of files with the tags that were retrieved as a result of this function is shown in FIG. 3.

At step 210, the processing logic 104 dynamically assembles a directory entry structure that includes a hierarchical view of tags identified from the tag associations. A sample directory structure 304 that includes the files/information from the list 302 is shown in FIG. 3. In an exemplary embodiment, all views on a file listed in multiple directories will point to the same file content that is stored in file data 108 portion of the data store 105. For example, the file "empirestatebldg.jpg" tagged with "ny" and "vacation" shown in the record 302 is reflected (although hidden) in the directory entry structure 304 within folders 306, 308, 314, and 316. Likewise, the file "eiffeltower.jpg" tagged with "vacation" and "paris" shown in record 302 is reflected (although hidden) in the directory entry structure 304 within folders 310, 312, 314, and 318. At step 212, the directory entry structure produced from step 210 (e.g., structure 304) is delivered to the application 120.

As indicated above, the processing logic 104 is configured to perform various functions in furtherance of the file system tagging processes described herein. These functions are performed on aspects of the data store 105 as described herein. For example, a function "get_filehandle_by_path" returns a file handle on the file for a given path (i.e., the path includes all tags in its order). Another function "get_filenames_for_tag_set" returns all file names that are associated with all of the tags specified. In addition, a function "delete_file_by_path" deletes a file and all of its associations. A function "rename_file_by_path" renames a file in the store 105 and updates all tag associates to reflect the new name. A function "remove_tag_from_file_by_filehandle" removes a tag association from a file that is referenced by a file handle. A function "add_tag_to_file_by_filehandle" adds a tag association to a file that is referenced by a file handle and returns an error on collisions. Tag spheres can be handled by the data store 105 without any knowledge and interference of the upper file system layer.

Figure 5:
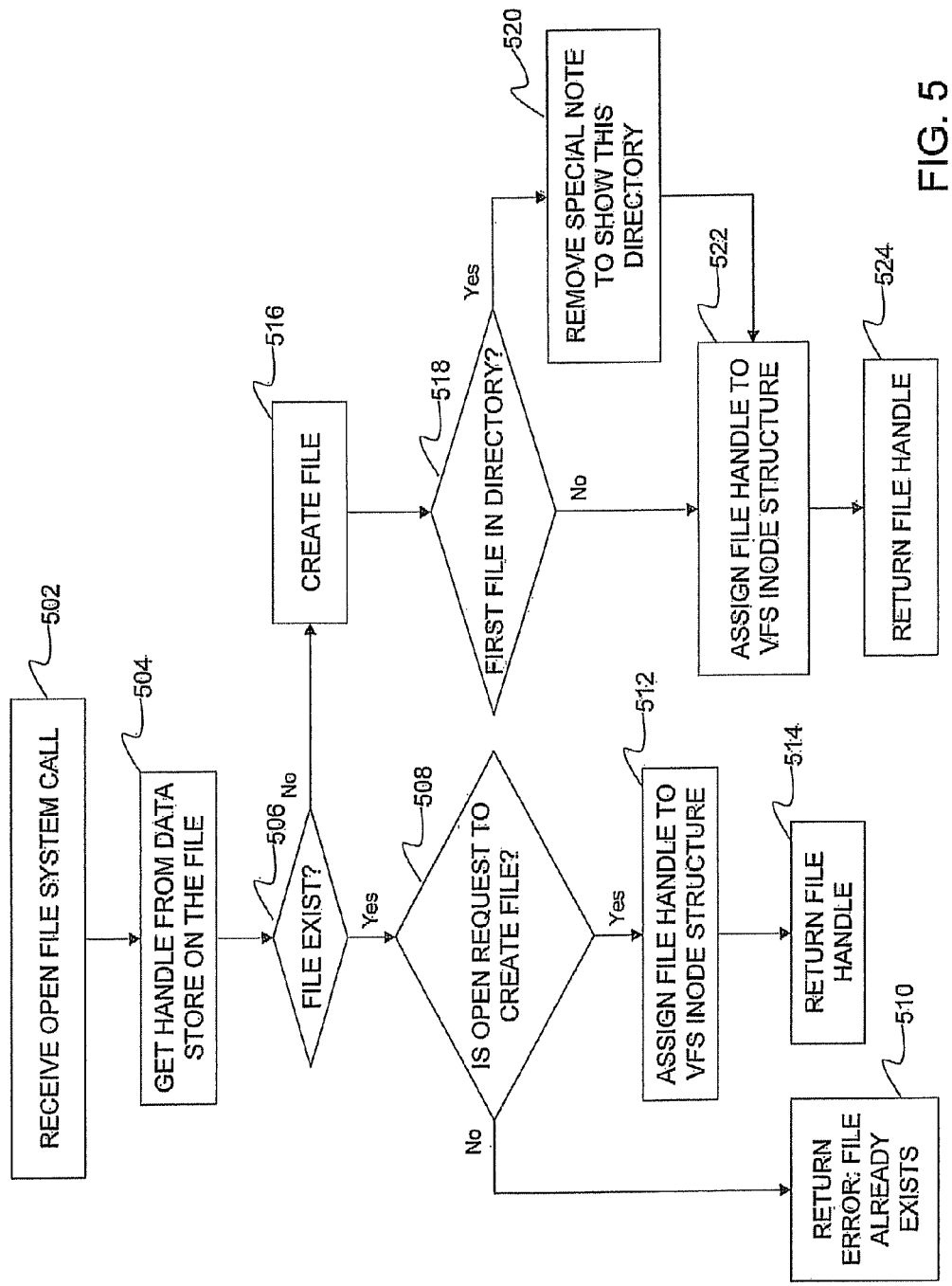
FIG. 5 is a flow diagram describing a process for implementing an open file system call via the file system tagging operations in an exemplary embodiment.

Turning now to FIG. 5, a flow diagram describing a system call (open function) performed via the VFS 102 elements will now be described in an exemplary embodiment. At step 502, the VFS 102 (via VFSI 106) is received from the target application 120. At step 504, the processing logic 104 gets a file handle on the file stored in the data store 105 (e.g., via the function "get_filehandle_by_path"). This function also determines whether the file exists already. At step 506, it is determined whether the file exists. If so, the processing logic 104 determines whether the request of step 502 is a request to create a file at step 508. If not, the processing logic 104 returns an error that the file already exists.

At step 508, if the request is to create a file, the processing logic 104 assigns a file handle to the virtual file system inode structure at step 512 and returns the file handle at step 514.

Returning now to step 506, if it is determined that the file does not already exist, the processing logic 104 creates a file at step 516. It is then determined whether this newly created file is the first file to exist in the corresponding directory at step 518. This may be accomplished by using the function "get_filenames_for_tag_set"). If so, the processing logic 104 removes any notes in the upper layer file system to this directory at step 520. If the file is not the first in the directory (step 518), or alternatively, once the special notes have been removed (at step 520), the processing logic 104 assigns a file handle to the VFS inode structure. The file is in the data store 105, and the dynamic view of the data store 105 will be able to exhibit the file. At step 524, the file handle is returned. It will be understood that other system calls (e.g., "read", "write", "seek", "close", etc., will operate on the file handle that was acquired during the open call.

An end user of the file system tagging processes may view a data entry structure as is typically found in operating systems/file systems. However, the file system tagging processes enable the content of a directory to represent all files that have all tag strings of which a file path consists (e.g., logical AND for tags). A file tagged with multiple tags can be found in any subdirectory, the directory parts of which consist of one, some, or all of the tag strings. The top level directory contains all files (i.e., a file tagged with A and B can be found in /, /A/, /B/, /A/B/ and /B/A/). Adding a new tag for a user is a simple as creating a directory—files stored or moved in there are tagged accordingly, which means that the newly tagged file is seen in the top level directory as well as all permutations of one, some or all directory names.

In addition, the file content is stored only once using a modified (in-kernel) file system or a daemon which can use links to represent the same file under multiple paths. It is up to the implementer, whether the file consists of links, or all tagged file locations link to the "real" file in an "attic", or a file system implements this without links or references, but natively. In any case, if a file is changed, it is changed for all instances (i.e., path permutations).

In addition to the open function process described above in FIG. 5, other file operations may be performed via the VFS 102 elements, as will now be described in exemplary embodiments. The ordering of the file operations described herein are provided for ease of explanation and are not to be construed as limiting in the order shown.

In a first file operation, a directory is created. The directory may be removed directly when it is determined no process uses it anymore. Alternatively, the directory may not be removed, or it may be removed after a specified amount of time after the last process has stopped using it (e.g., depending on a policy employed).

In a second file operation, a file is created in a directory. Once the file is created, the path to the file is analyzed (e.g., all subdirectory components in the path are the tags relevant to this file). Siblings are created (e.g., using links or duplicated entries in the filesystem (e.g., VFS 102)) in all path permutations consisting of none (top level directory—i.e., the top level directory relative to the tagging filesystem area), one, some, or all tags. A sibling refers to the same file with a different path permutation.

In a third file operation, a file is removed from a directory. In this operation, all siblings are removed as well. If this file or a sibling file has been the last file in the corresponding directory, the directory may or may not be removed, or may be removed automatically after a specified amount of time (e.g., depending on a policy employed).

In a fourth file operation, a file is renamed. In this operation, the file and all siblings are renamed to the same destination name and the file remains in the same directory.

In a fifth operation, a file is moved from one directory to another directory. In this operation, source and destination paths are analyzed for path components (i.e., tags) that are in the destination path but not in the source path (i.e., additional tags). Additionally, source and destination paths are analyzed for path components (i.e., tags) that are in the source path but not in the destination path (i.e., tags to be removed). All siblings, the path of which contains a to-be-removed tag, are deleted. If this has been the last file in the corresponding directory, the directory may or may not be removed, or may be removed automatically after a specified amount of time (e.g., depending upon a policy employed). For additional tags, siblings are created as described above in the second file operation.

The following describes tag manipulation operations as perceived by the filesystem (e.g., VFS 102) and corresponds with the file operations described above.

A directory is created (mkdir):

The directory is created and added to the current directory. This directory may be stored in the upper layer part of the filesystem, as the store will have no information on this directory as no file is in it yet. Empty directories may be removed after some time has elapsed since the last access to this directory.

A file is created in a directory: (see description for the "open" case above).

A file is removed from a directory: the file may be removed from the store using delete_file_by_path.

A file is renamed (i.e., remains in the same directory): The file is renamed in the store along with all tags associations to it, using rename_file_by_path.

A file is moved from one directory to another directory:

Source and destination paths are analyzed for path components (tags). The following three cases are considered:

Case (1)—some tags are in the source path but not in the destination path (to-be-removed tags);

Case (2)—some tags are in the destination path but not in the source path (additional tags);

Case (3)—a combination of case (1) and case (2). Procedures for both cases are followed (starting with case (1) steps).

Tag sets of the source and destination path are equal (see "rename" description above).

The elements of case (1) will now be described:

get a handle on the file stored in range A through the store function get_filehandle_by_path—this also checks whether the file exists already. If the file does not exist, return an error. For each tag that that is in the source path but not in the destination path, the function remove_tag_from_file_by_ handle is called.

The elements of case (2) will now be described:

Get a handle on the file stored in range A through the store function get_filehandle_by_path—this also checks, whether the file exists already. If the file does not exist, return an error. For each tag that is in the destination path but not in the source path, the function add_tag_to_file_by_handle is called. If collisions occur, add_tag_to_file_by_handle returns an error code and this error code will be passed to the user.

Various use cases (e.g., what the user, application, tag handling utility would do to remove a tag association from a file) will now be described. The following are non-limiting examples of use cases and correspond with the file operations described above.

In a first use case, a search for a file (based on tags) is described. The top level directory contains all files. To restrict the search and only look at a subset of files tagged with a specific tag, one would change into the directory with the name of the specific tag. This last step may be repeated to further narrow the search.

In a second use case, a file may be created (using no tags) in the top level directory.

In a third use case, a file may be created (using one or more tags). For all tags that are to be associated with the file, the process includes changing into the subdirectory with the name of the tag (if it doesn't yet exist, it is created) and the file is saved into the subdirectory. If the user creates directories and does not save anything inside, the directory may be removed right after it is determined no process uses it anymore. Alternatively, it may not be removed, or it may be removed after a specified amount of time after the last process has stopped using it (e.g., depending on a policy employed). One or more tags may be added to the file by locating an instance of the file, and for all additional tags that are to be associated with this file: the process includes changing into the subdirectory with the name of the tag (if it doesn't exist, create it), and save the file in the subdirectory. If the user creates directories and does not save anything inside, the directory may be removed right after it is determined that no process uses it anymore. Alternatively, it may not be removed, or it may be removed after a specified amount of time after the last process has stopped using it (e.g., depending on a policy employed).

One or more tags may be removed from a file by locating an instance of the file, identifying a path that contains all subdirectory components that the original file has, and remove the subdirectory component named as the to-be-removed-tag from the path. The file is moved to the identified path. If the original directory is now empty, it may be removed right away, it may not be removed, or it may be removed after a specified amount of time (e.g., depending on a policy employed).

In addition, one or more tags may be removed from the whole filesystem area by changing into one of the directories called like the tag and move all files one level higher. The remaining directory may be removed right away, it may not be removed, or it may be removed after a specified amount of time (e.g., depending on a policy employed).

A file may be deleted by removing the file. If the original directory is now empty, it may be removed right away, it may not be removed, or it may be removed after a specified amount of time (e.g., depending on a policy employed).

A tag of a file may be changed by locating an instance of the file, and moving it to the appropriate directory (following the rules described above for adding and removing a tag).

In order to list all tags of a file, the process includes finding all copies of the file. The sum of the pathname components corresponds to the tag list. Optionally holding a reference while doing so (i.e., opening the file) can be used to prevent changes in the tag list while the search is going on.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of enabling file system tagging by an application, comprising:
    creating tag associations for the file system in a storage device, comprising:
        associating at least one tag with a file object of the file system in the storage device, comprising:
            allocating a file association structure in the storage device, the file association structure having attributes including a pointer to a file handle of the file object and a list of names of tags associated with the file object; and
            for each tag in the file system, allocating a tag structure, the tag structure comprising:
                a name of the tag;
                a list of file associations for the tag, the list specifying a linked list of file association objects defined by the file association structure;
                a tag sphere indicator, wherein the tag sphere indicator is used to control a visibility of files associated with the tag in the file system by an end user; and
                a list of tags contained within a tag sphere of the tag structure; and
    in response to receiving a system call from the application, the system call including a request for a read directory operation on the file system, performing:
        retrieving the tag associations from the storage device to identify the file object;
        dynamically assembling a directory entry structure that includes a hierarchical view of tags, the directory entry structure comprising a plurality of root directories and at least one subdirectory, the plurality of root directories corresponding to the tags with a tag sphere indicator enabled, and one or more subdirectories corresponding to the tags associated with the file object, the directory entry structure assembled based on the tag associations and corresponding file object; and
        returning the directory entry structure to the application, wherein the file object and a second file object share at least one common tag, the file object and the second file object are in distinct tag spheres, and selecting the common tag within the tag sphere of corresponding file causes the second file object to be hidden.

2. The method of claim 1, further comprising creating directory, the directory created by:
    specifying one or more tags; and
    adding file objects to the one or more tags via the file association structure and the tag structure.

3. The method of claim 1, the method further comprising:
    separating file objects assigned a single tag into different tag spheres without removing the single tag responsive to enabling a tag sphere indicator in the tag sphere indicator field of the tag structure for a selected tag.

4. The method of claim 3, further comprising:
    storing, in the tag structure of a given tag, a list of all tag structures representing tags that belong to the same tag sphere as the given tag.

5. The method of claim 3, further comprising:
    associating tags that do not belong to a tag sphere to a root tag sphere, the root tag sphere representing a list of all tag structures for tags that do not belong to a tag sphere.

6. The method of claim 1, further comprising excluding a designated file object from being tagged by storing a name or path expression of the designated file object in an exclusion pattern list, the exclusion pattern list retrieved and searched before assembling the directory entry structure.

7. The method of claim 1, wherein a single instance of the file object is stored in the storage device and mapped to each of the corresponding tags by the tag associations and the pointer to the file object via the corresponding file association structure.

8. The method of claim 1, wherein the file object is at least one of a:
    text document;
    image file;
    digital audio file; and
    multi-media file.

9. A system for enabling file system tagging by an application, comprising:
    a virtual file system associated with an operating system, the operating system executing on a processor device; and
    processing logic executing on the virtual file system via the processor device, the processing logic implementing a method, comprising:
        creating tag associations for the file system in a storage device, comprising:
            associating at least one tag with a file object of the file system in the storage device, comprising:
                allocating a file association structure in the storage device, the file association structure having attributes including a pointer to a file handle of the file object and a list of names of tags associated with the file object; and
                for each tag in the file system, allocating a tag structure, the tag structure comprising:
                    a name of the tag;
                    a list of file associations for the tag, the list specifying a linked list of file association objects defined by the file association structure;
                    a tag sphere indicator, wherein the tag sphere indicator is used to control a visibility of files associated with the tag in the file system by an end user; and
                    a list of tags contained within a tag sphere of the tag structure; and
        in response to receiving a system call from the application, the system call including a request for a read directory operation on the file system, performing:

retrieving the tag associations from the storage device to identify the file object;

dynamically assembling a directory entry structure that includes a hierarchical view of tags, the directory entry structure comprising a plurality of root directories and at least one subdirectory, the plurality of root directories corresponding to the tags with a tag sphere indicator enabled, and one or more subdirectories corresponding to the tags associated with the file object, identified from the directory entry structure assembled based on the tag associations and corresponding file object; and returning the directory entry structure to the application wherein the file object and a second file object share at least one common tag, the file object and the second file object are in distinct tag spheres, and selecting the common tag within the tag sphere of corresponding file causes the second file object to be hidden.

10. The system of claim 9, wherein the processing logic further implements:

creating directory, the directory created by:

specifying one or more tags; and adding file objects to the one or more tags via the file association structure and the tag structure.

11. The system of claim 9, further comprising:

separating file objects assigned a single tag into different tag spheres without removing the single tag responsive to enabling a tag sphere indicator in the tag sphere indicator field of the tag structure for a selected tag.

12. The system of claim 11, wherein the processing logic further implements:

storing, in the tag structure of a given tag, a list of all tag structures representing tags that belong to the same tag sphere as the given tag.

13. The system of claim 11, wherein the processing logic further implements:

associating tags that do not belong to a tag sphere to a root tag sphere, the root tag sphere representing a list of all tag structures for tags that do not belong to a tag sphere.

14. The system of claim 9, wherein the processing logic further implements:

excluding a designated file object from being tagged by storing a name or path expression of the designated file object in an exclusion pattern list, the exclusion pattern list retrieved and searched before assembling the directory entry structure.

15. The system of claim 9, wherein a single instance of the file object is stored in the storage device and mapped to each of the corresponding tags by the tag associations and the pointer to the file object via the corresponding file association structure.

16. The system of claim 9, wherein the file object is at least one of a:

text document;

image file;

digital audio file; and multi-media file.

17. A computer program product for enabling file system tagging by an application, the computer program product comprising a non-transitory computer-readable medium encoded with program code for causing a computer to implement a method, the method comprising:

creating tag associations for the file system in a storage device, comprising:

associating at least one tag with a file object of the file system in the storage device, comprising:

allocating a file association structure in the storage device, the file association structure having attributes including a pointer to a file handle of the file object and a list of names of tags associated with the file object; and for each tag in the file system, allocating a tag structure, the tag structure comprising:

a name of the tag;

a list of file associations for the tag, the list specifying a linked list of file association objects defined by the file association structure;

a tag sphere indicator, wherein the tag sphere indicator is used to control a visibility of files associated with the tag in the file system by an end user; and a list of tags contained within a tag sphere of the tag structure; and in response to receiving a system call from the application, the system call including a request for a read directory operation on the file system, performing:

retrieving the tag associations from the storage device to identify the file object;

dynamically assembling a directory entry structure that includes a hierarchical view of tags, the directory entry structure comprising a plurality of root directories and at least one subdirectory, the plurality of root directories corresponding to the tags with a tag sphere indicator enabled, and one or more subdirectories corresponding to the tags associated with the file object, identified from the directory entry structure assembled based on the tag associations and corresponding file object; and returning the directory entry structure to the application;

wherein the file object and a second file object share at least one common tag, the file object and the second file object are in distinct tag spheres, and selecting the common tag within the tag sphere of corresponding file causes the second file object to be hidden.

18. The computer program product of claim 17, wherein the program code further comprises instructions for performing:

creating directory, the directory created by:

specifying one or more tags; and adding file objects to the one or more tags via the file association structure and the tag structure.

19. The computer program product of claim 17, the method further comprising:

separating file objects assigned a single tag into different tag spheres without removing the single tag responsive to enabling a tag sphere indicator in the tag sphere indicator field of the tag structure for a selected tag.

20. The computer program product of claim 19, wherein the program code further includes instructions for performing:

storing, in the tag structure of a given tag, a list of all tag structures representing tags that belong to the same tag sphere as the given tag.

* * * * *